(12) United States Patent
Peng et al.

(10) Patent No.: US 7,831,811 B2
(45) Date of Patent: Nov. 9, 2010

(54) SYSTEM AND METHOD FOR MANAGING A REGISTER-BASED STACK OF OPERAND TAGS

(75) Inventors: Jinzhan Peng, Beijing (CN); Gansha Wu, Beijing (CN); Peng Guo, Beijing (CN); Xin Zhou, Beijing (CN); Zhiwei Ying, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/567,822

(22) PCT Filed: Oct. 31, 2005

(86) PCT No.: PCT/CN2005/001809

§ 371 (c)(1),
(2), (4) Date: Feb. 8, 2006

(87) PCT Pub. No.: WO2007/051347

PCT Pub. Date: May 10, 2007

(65) Prior Publication Data

US 2008/0209171 A1 Aug. 28, 2008

(51) Int. Cl.
*G06F 9/00* (2006.01)
(52) U.S. Cl. .................................................. 712/225
(58) Field of Classification Search .................. 712/202, 712/225
See application file for complete search history.

(56) References Cited

U.S. PATENT DOCUMENTS 4,757,440 A * 7/1988 Scheuneman ................ 714/53

| 6,205,541 | B1 * | 3/2001 | Tran et al. ................... 712/217 |
| 6,317,869 | B1 * | 11/2001 | Adl-Tabatabai et al. ..... 717/132 |
| 6,651,159 | B1 * | 11/2003 | Ramesh et al. .............. 712/209 |
| 7,024,537 | B2 * | 4/2006 | Pickett et al. ................ 711/217 |
| 7,111,096 | B1 * | 9/2006 | Banning et al. ............. 710/100 |
| 7,302,550 | B1 * | 11/2007 | Merck ........................ 712/202 |
| 2004/0015873 | A1 * | 1/2004 | Sokolov et al. ............. 717/127 |

FOREIGN PATENT DOCUMENTS

WO 0004444 A1 7/2000
WO 2004068341 A1 8/2004

OTHER PUBLICATIONS

Ashwin et al. "Garbage Collection in Object oriented databases using transactional cyclic reference counting" Proceedings of the $23^{rd}$ VLDB Conference, 1997.*
International Search Report for PCT/CN2005/001809 mailed May 25, 2006, 2 pages.

* cited by examiner

*Primary Examiner*—Jacob Petranek
(74) *Attorney, Agent, or Firm*—Trop, Pruner & Hu, P.C.

(57) ABSTRACT

A virtual machine in a processing system manages type information for operands. In one embodiment, the virtual machine accomplishes the following results through execution of a single instruction: adding an operand tag to a tag stack, and updating a stack pointer for the tag stack to recognize the addition of the operand tag to the tag stack. The single instruction may be a shift instruction, for example. The tag stack may reside in a tag stack register, and each operand tag may indicate whether a corresponding operand on an operand stack is to be treated as a reference operand or a non-reference operand. Other embodiments are described and claimed.

19 Claims, 3 Drawing Sheets

SYSTEM AND METHOD FOR MANAGING A REGISTER-BASED STACK OF OPERAND TAGS

CROSS-REFERENCE TO RELATED APPLICATION

This application is a National Phase application of, and claims priority to, International Application No. PCT/CN2005/001809, filed Oct. 31, 2005, entitled SYSTEM AND METHOD FOR MANAGING A REGISTER-BASED STACK OF OPERAND TAGS

FIELD OF THE INVENTION

The present disclosure relates generally to the field of data processing, and more particularly to methods and related apparatus for managing type information for operands on an operand stack.

BACKGROUND

Typed stack languages, such as Java® bytecode and Common Intermediate Language (CIL), typically have a last-in-first-out (LIFO) operand stack on which virtual machine (VM) instructions can save and retrieve operands. Each operand may be accompanied with its type information (e.g., reference or non-reference) when it is pushed onto the stack. A VM may use this type information to facilitate certain runtime services, such as execution-time type-safety verification, for example.

The type information may also be used during garbage collection (GC), for root set enumeration. Typically, the GC routine needs to check every operand on the stack, to determine whether the operand is a reference to an object in the managed heap. Operands that are not references to objects in the managed heap may be referred to as numeric or non-reference operands. Non-reference operands may be unimportant for GC, but operands that are references to objects are very important. All reference operands in the operand stack are typically treated as roots from which the GC routine performs object scanning.

If the GC routine can accurately determine the reference or non-reference property of each operand on the stack, the GC routine is considered accurate. For purposes of this disclosure, an operand is said to be of the "reference" type if the operand is a reference to an object, and to be of the "non-reference" type if the operand is not a reference to an object. To support accurate GC, each operand may be associated with a corresponding tag to indicate whether or not the operand is a reference to an object.

As described in greater detail below, conventional implementations for operand tags typically provide either space efficiency or computational efficiency. As recognized by the present invention, it would be beneficial to implement operand tags in a manner that increases the space efficiency, the computational efficiency, or both, relative to conventional techniques. It would also be beneficial if the implementations with increased efficiency could be used by routines for GC and/or other types of routines.

BRIEF DESCRIPTION OF THE DRAWINGS

Features and advantages of the present invention will become apparent from the appended claims, the following detailed description of one or more example embodiments, and the corresponding figures, in which:

DETAILED DESCRIPTION

Figure 1:
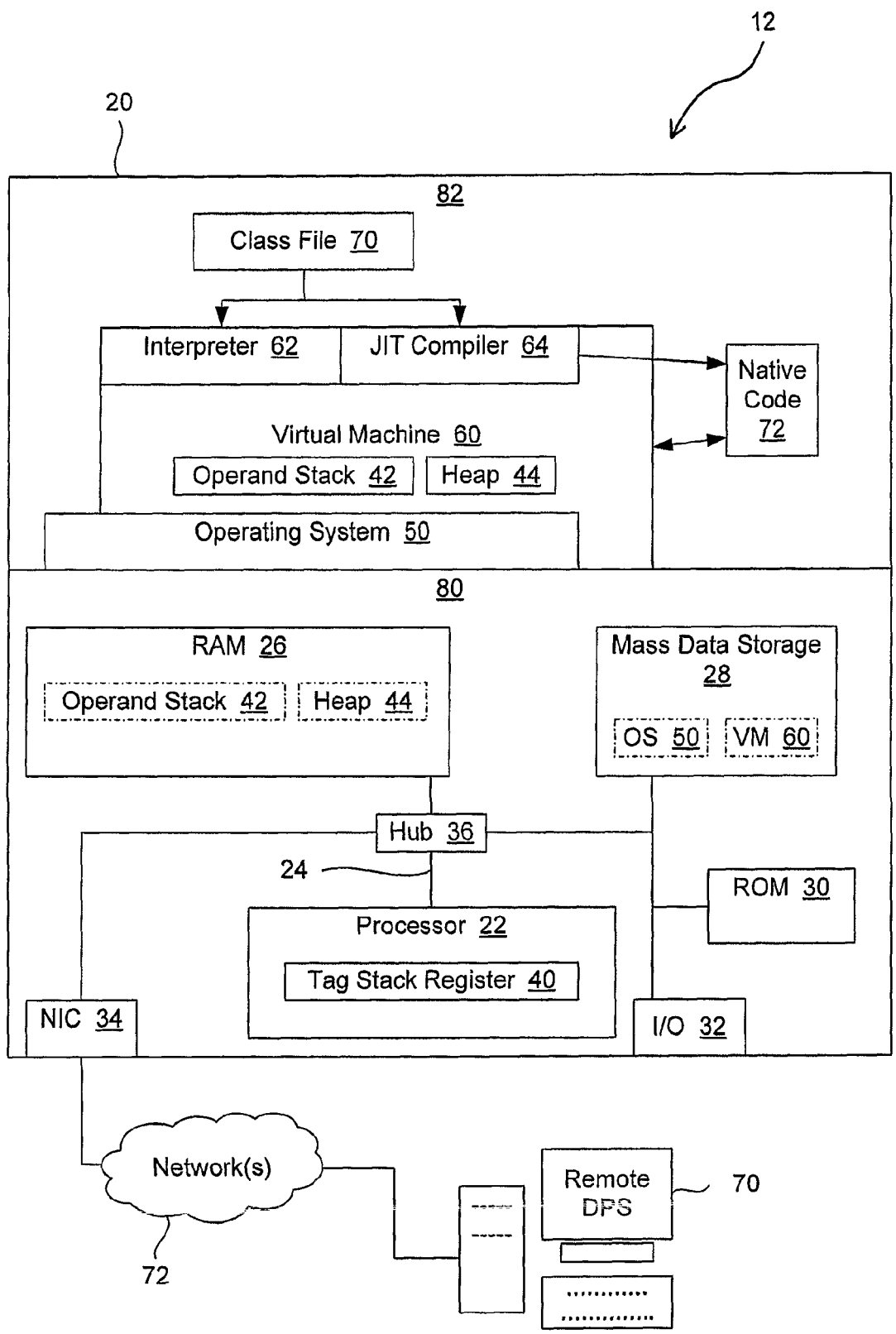
FIG. 1 is a block diagram depicting a suitable data processing environment in which certain aspects of an example embodiment of the present invention may be implemented.

This disclosure uses the term "type tag management" to refer to techniques for maintaining type tags for operands on an operand stack. Good type tag management techniques should be efficient with regard to the amount of space needed to store the type tags. Such techniques should also efficiently facilitate the retrieval of sequences of operands from the stack (i.e., walking the stack), for example to determine which portions of memory are allocated to a program but no longer in use. Four conventional techniques for managing type tags are described below.

The first such technique uses an operand stack and a separate tag stack. The tag stack has an entry for each entry on the operand stack, and the tag stack entries indicate whether or not the corresponding operand stack entries are of the reference type.

The second such technique collocates the operand stack and the tag stack using a single stack. Thus, a single stack entry may include two values: an operand value and a tag value. For instance, one entry may have an operand value of 0x4f3204 and a tag value of 1, with 1 tagging the operand as a reference type. Another entry may have an operand value of 0x000005 and a tag value of 0, with 0 tagging the operand as a numeric or non-reference type.

The third technique encodes the reference tag into the value of each operand, for example as the most significant bit (MSB) of the operand. For instance, an entry with the value 0xcf3204 on the operand stack may be interpreted as having the reference type, due to the MSB being 1, while an entry with the value 0x000005 may be interpreted as having a non-reference type.

The fourth technique uses an operand stack to hold operands, as well as a bit vector tag map to hold reference tags. Each bit in the tag map may correspond to an entry in the operand stack. A reference tag value of 1 may indicate that the corresponding operand has the reference type, while a tag value of 0 may indicate that the corresponding operand has the non-reference type.

Techniques 1 and 2 may require substantial memory and computational resources to manipulate tags and stack state (e.g., stack pointers). These techniques may consume more space than alternative techniques, but they are usually faster than other conventional techniques. For instance, techniques 1 and 2 may allow stack walking to proceed word by word (assuming each tag is one word), which may result in code that is computationally efficient. Technique 3 may also allow for efficient stack walking with little performance overhead, and it may not require any additional memory for the operand tags. However, technique 3 sacrifices the precision of operand values.

Technique 4 may require less storage space than techniques 1 and 2, due to the storage efficiency of the bit vector. However, more instructions may be required to access bits and maintain stack depth. These more complex bit iterating operations may require more computational resources. However, technique 4 might be more cache friendly, due to a small memory footprint for the bit vector.

Experimental results have shown that the performance overhead of maintaining tag stacks can reach to more than ten percent in an interpreter-based execution environment. That percentage may be much higher if compilers are enabled. Consequently, computational efficiency is an important aspect of type tag management.

The present disclosure describes a new approach for implementing operand tags. According to one or more embodiments, the approach provides for very efficient tag and state manipulation, with minimal memory requirements. In addition, unlike the third technique described above, one or more embodiments of the approach do not sacrifice precision of numeric operands to achieve the aforementioned efficiency.

FIG. 1 is a block diagram depicting a suitable data processing environment 12 in which certain aspects of an example embodiment of the present invention may be implemented. Data processing environment 12 includes a processing system 20 that includes various hardware components 80 and software components 82. The hardware components may include, for example, a processor or central processing unit (CPU) 22, or multiple processors, communicatively coupled to various other components via one or more system buses 24 or other communication pathways or mediums.

As used herein, the terms "processing system" and "data processing system" are intended to broadly encompass a single machine, or a system of communicatively coupled machines or devices operating together. Example processing systems include, without limitation, distributed computing systems, supercomputers, high-performance computing systems, computing clusters, mainframe computers, mini-computers, client-server systems, personal computers (PCs), workstations, servers, portable computers, laptop computers, tablet computers, personal digital assistants (PDAs), telephones, handheld devices, entertainment devices such as audio and/or video devices, and other devices for processing or transmitting information.

Processing system 20 may be controlled, at least in part, by input from conventional input devices, such as a keyboard, a pointing device such as a mouse, etc. Processing system 20 may also respond to directives or other types of information received from other processing systems or other input sources or signals. Processing system 20 may utilize one or more connections to one or more remote data processing systems 70, for example through a network interface controller (NIC) 34, a modem, or other communication ports or couplings. Processing systems may be interconnected by way of a physical and/or logical network 72, such as a local area network (LAN), a wide area network (WAN), an intranet, the Internet, etc. Communications involving network 72 may utilize various wired and/or wireless short range or long range carriers and protocols, including radio frequency (RF), satellite, microwave, Institute of Electrical and Electronics Engineers (IEEE) 802.11, 802.16, 802.20, Bluetooth, optical, infrared, cable, laser, etc.

Within processing system 20, processor 22 may be communicatively coupled to one or more volatile or non-volatile data storage devices, such as random access memory (RAM) 26, read-only memory (ROM) 28, mass storage devices 30 such as integrated drive electronics (IDE) or small computer system interface (SCSI) hard drives, and/or other devices or media, such as floppy disks, optical storage, tapes, memory sticks, compact flash (CF) cards, digital video disks, etc. For purposes of this disclosure, the term "ROM" may be used in general to refer to non-volatile memory devices such as erasable programmable ROM (EPROM), electrically erasable programmable ROM (EEPROM), flash ROM, flash memory, etc. Processor 22 may also be communicatively coupled to additional components, such as video controllers, SCSI controllers, network controllers, universal serial bus (USB) controllers, input devices such as a keyboard, a mouse, a camera, etc. Processing system 20 may also include one or more bridges or hubs 36, such as a memory controller hub, an input/output (I/O) controller hub, a PCI root bridge, etc., for communicatively coupling system components. As used herein, the term "bus" includes pathways that may be shared by more than two devices, as well as point-to-point pathways.

Some components, such as NIC 34, for example, may be implemented as adapter cards with interfaces (e.g., a PCI connector) for communicating with a bus. Alternatively, NIC 34 and other devices may be implemented as embedded controllers, using components such as programmable or non-programmable logic devices or arrays, application-specific integrated circuits (ASICs), embedded computers, smart cards, and the like.

The invention is described herein with reference to or in conjunction with data such as instructions, functions, procedures, data structures, application programs, configuration settings, etc. When the data is accessed by a machine, the machine may respond by performing tasks, defining abstract data types or low-level hardware contexts, and/or performing other operations, as described in greater detail below. The data may be stored in volatile and/or non-volatile data storage. For purposes of this disclosure, the term "program" is used in general to cover a broad range of software constructs, including applications, routines, methods, modules, drivers, subprograms, processes, and other types of software components.

For instance, data storage device 30 and/or RAM 26 may include various sets of instructions which, when executed, perform various operations. Such sets of instructions may be referred to in general as software.

As illustrated in FIG. 1, in the example embodiment, the programs or software components 82 may include an operating system (OS) 50 and a virtual machine (VM) 60. One or more example embodiments are described with reference to a Java virtual machine (JVM). However, the invention is not limited to that specific type of VM and may be used to advantage in any suitable VM.

In the example embodiment, VM 60 receives a class file 70 containing the bytecode instructions for the program to be executed, and VM 60 uses an interpreter 62 to interpret those instructions during runtime. VM 60 may also use a just-in-time (JIT) compiler 64 to compile some or all of the instructions from class file 70 into native instructions 72 that can be executed by processor 22. For instance, if VM 60 determines that a certain portion of code from class file 70 has been executed many times, VM 60 may compile that portion into native code 72, and VM 60 may thereafter use native code 72 instead of the corresponding bytecode instructions to improve the execution performance.

According to the example embodiment, VM 60 may use a portion of memory known as the heap 44 to store objects that are created by the executing program. In addition, VM 60 may use a portion of memory known as the operand stack 42 as a work space for use by the bytecode instructions. For example, operand stack 42 may be used to store parameters and results for the bytecode instructions. For purposes of this disclosure, the items stored on operand stack 42 may be referred to in general as operands. As indicated by the solid lines surrounding operand stack 42 and heap 44 in VM 60, operand stack 42 and heap 44 may be considered parts of VM 60. However, as indicated by the dashed lines surrounding operand stack 42 and heap 44 in RAM 26, in the example embodiment, operand stack 42 and heap 44 are actually stored in RAM 26, or possibly in a processor cache that serves as RAM.

In the example embodiment, VM 60 also recognizes and uses a processor register called the tag stack register 40.

Figure 2:
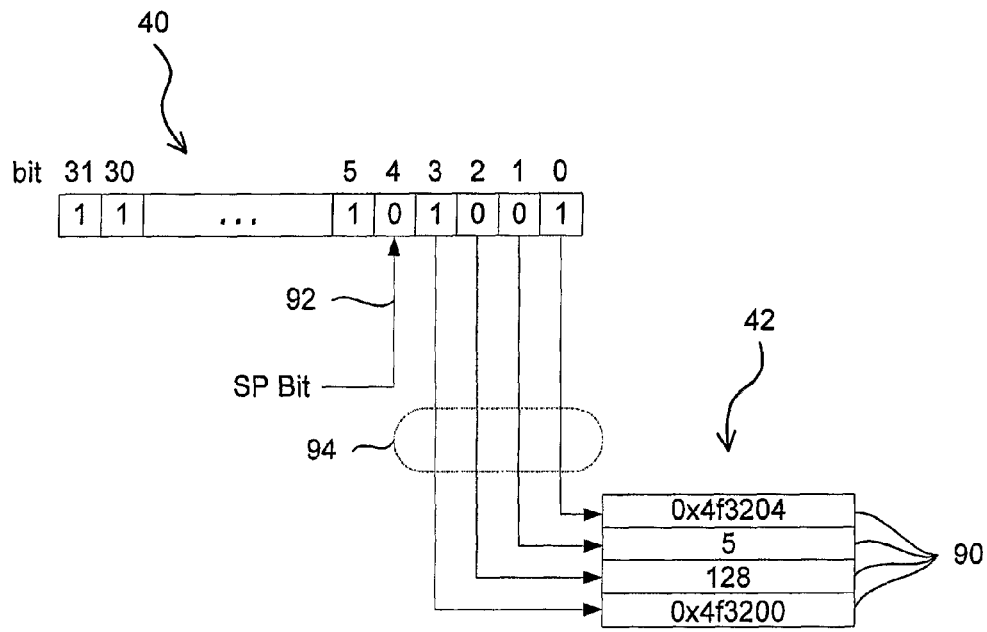
FIG. 2 is a block diagram depicting the example operand stack and tag stack register of FIG. 1 in greater detail.

FIG. 2 is a block diagram depicting the example operand stack 42 and tag stack register 40 of FIG. 1 in greater detail. For purposes of this disclosure, a "tag stack register" is a register to store a stack of operand tags, and a "register tag stack" is the stack of operand tags that resides in the tag stack register.

In the example embodiment, tag stack register 40 is used as a stack to hold reference tags for the operands 90 in operand stack 42. Individual bits in tag stack register 40 can serve as reference tags, with the value of 0 indicating that the corresponding operand is a non-reference operand, and the value of 1 indicating that the corresponding operand is a reference operand. As described in greater detail below, in the example embodiment, only one register instruction is needed to push and pop tags, and the tag stack is self-sustainable, in that the stack pointer for the tag stack is implicitly encoded in the register.

In the example embodiment, tag stack register 40 is illustrated as a 32-bit wide register. However, registers with different widths may be used in alternative embodiments. In the example embodiment, the MSB that has a value of 0 serves as the stack pointer (SP) of the tag stack, as indicated by arrow 92. Thus, the bit position of the SP serves to indicate the stack depth. For instance, in FIG. 2, the MSB with the value of 0 resides in bit position 4, and that bit position corresponds to the number of operand tags in tag stack register 40. Thus, the stack depth is the amount of bits after SP bit in tag stack register 40, and those bits after the SP bit constitute the tags on the stack.

For instance, in FIG. 2, the SP bit indicates that tag stack register 40 has a depth of four (i.e., that tag stack register 40 contains tags for four operands). Also, tag stack register 40 contains one tag in each of the bit positions 0 through 3. As indicated by arrows 94, each of those tags provides type information for a corresponding operand 90 in operand stack 42. Specifically, as indicated above, a 1 in one of those bits indicates that the corresponding operand is to be treated as a reference operand, and a 0 indicates that the corresponding operand is to be treated as a non-reference operand. As illustrated, the order of the tags from right to left (i.e., from least significant bit (LSB) to MSB) corresponds to the order of the corresponding operands on operand stack 42 from top to bottom. Also, as described in greater detail below, all bits before the SP bit have a value of 1.

Figure 3:
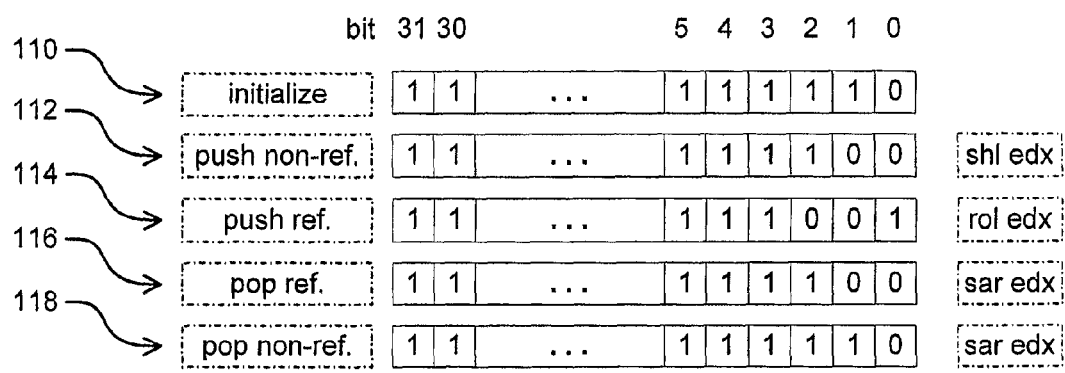
FIG. 3 is a block diagram depicting an example sequence of changing values in the tag stack register.

FIG. 3 is a block diagram depicting an example sequence of changing values in tag stack register 40. For example, the tag stacks at rows 112-118 in FIG. 3 may be the kind of tag stacks created in response to the following sequence of operations involving the operand stack: (a) push a non-reference operand, (b) push a reference operand, (c) pop a reference operand, and (d) pop a non-reference operand.

Figure 4:
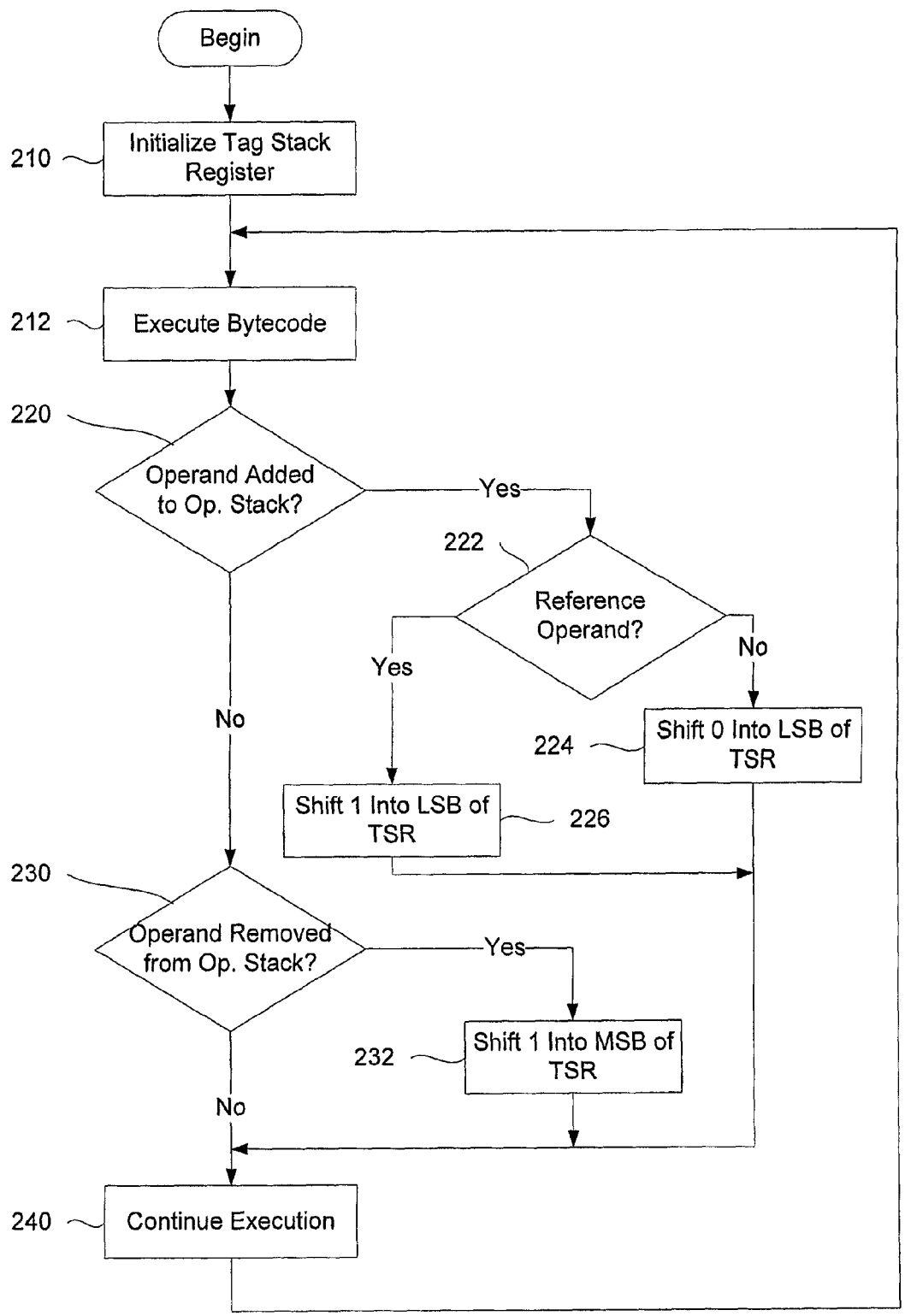
FIG. 4 is a flowchart depicting various aspects of a process for managing a register-based stack of operand tags, according to an example embodiment of the present invention.

FIG. 4 is a flowchart depicting various aspects of an example embodiment of a process for managing tag stack register 40. The paragraphs below use FIG. 3 in conjunction with FIG. 4 to illustrate an example embodiment of a method for managing operand tags.

The process of FIG. 4 may start with VM 60 receiving class file 70 and preparing to execute the instructions stored therein. As part of that preparation, VM 60 may initialize tag stack register 40, as indicated at block 210. As shown at row 110 of FIG. 3, in the example embodiment VM 60 initializes tag stack register 40 to have a 0 in the LSB, and 1's in all other bits. VM 60 thus initializes tag stack register 40 to have the SP bit at position 0, to indicate a stack depth of 0.

As indicated at block 212, VM 60 may then begin to execute bytecode instructions from class file 70. At block 220 VM 60 may determine whether an operand has been added to operand stack 42. If an operand has been added to operand stack 42, VM 60 may determine whether the operand is a reference operand, as depicted at block 222. As shown at block 224, if the operand is not a reference operand, VM 60 may shift a 0 into the LSB of tag stack register 40. For example, as indicated at row 112 of FIG. 3, VM 60 may use a shift left (SHL) operation, such as a register logic-shifting-left instruction, to shift all bits to the left with the LSB or right-most bit filled with 0. This operation will also automatically shift the SP bit to the left by 1 bit, to bit position 1, to accurately reflect the new stack depth of 1.

In the example embodiment, VM 60 may use a general purpose register such as the EDX register as tag stack register 40, and VM 60 may use an IA-32 instruction such as "SHL EDX" to shift a 0 into the LSB. However, in alternative embodiments, other registers may be used, as may other instructions, including registers and instructions for other processor architectures. Likewise, the other shift instructions referenced below, including the rotate instruction, are used for purposes of illustration. In alternative embodiments, other instructions may be used to perform the operations described or similar operations, including instructions for other processor architectures.

Referring again to block 222 of FIG. 4, if the operand is a reference operand, VM 60 may shift a 1 into the LSB of tag stack register 40, as indicated at block 226. For instance, as indicated at row 114 of FIG. 3, VM 60 may use a rotate left (ROL) operation, such as a register rotational-shifting-left instruction, to shift a 1 into the LSB. A single instruction, such as ROL EDX, may be used to accomplish this result, since tag stack register 40 was initialized with 1's in all position other than the SP bit. Since the high-end unused bits are 1's, the rotate left operation transfers a value of 1 from the MSB to the LSB. This operation also automatically adjusts the SP bit, as indicated above.

Referring again to block 220 of FIG. 4, if an operand was not added to operand stack 42, VM 60 determines whether an operand was removed from operand stack 42. If so, VM 60 may shift a 1 into the MSB of tag stack register 40, as indicated at block 232. For example, as indicated at rows 116 and 118 of FIG. 3, whenever an operand is removed from the operand stack, a shift right operation, such as shift arithmetic right (SAR), may be used to shift all bits of tag stack register 40 to the right, with the MSB or left-most bit filled with 1. This operation also automatically adjusts the SP bit to reflect the reduced stack depth. In the example embodiment, the same instruction may be used to pop tags in response to the removal of reference operands and non-reference operands from operand stack 42.

Referring again to FIG. 4, after adjusting tag stack register 40 in accordance with any changes to operand stack 42, or after determining no operands have been added to or removed from operand stack 42, VM 60 may continue execution of class file 70, as indicated at block 240. In particular, as indicated by the arrow returning to block 212, VM 60 may execute bytecode from class file 70, may again check for changes to operand stack 42 and may adjust tag stack register 40 accordingly, as described above.

In the example embodiment, VM 60 monitors the depth requirements for the tag stack, either statically before executing class file 70 or dynamically during execution. VM 60 prevents the stack depth from exceeding the register width minus 2, to ensure that the SP bit is preserved, and a 1 is preserved as the MSB, to support the desired behavior for the rotational and arithmetic shifting operations. In one embodiment, if an overflow situation can be detected statically (e.g., during compilation or threaded-code translation phase), the threaded-code translator or compiler may generate code to use conventional tag stack implementations.

If the overflow can only be detected at runtime, the interpreter or native code generated by compiler may perform overflow checking for some or all tag stack operations. When the highest bit contains the value of 0 (or sp-bit), that indicates a state of tag stack register overflow. VM 60 may check for overflow using any suitable technique. For example, in a processing system with a processor that uses the ARM® architecture, VM 60 may check the N clear condition. Upon detecting such a condition, VM 60 may insert special instructions to save the tag stack register to memory. Once the stack depth gets small enough, VM 60 may restore the tag values from memory to the tag stack register.

As has been described, in the example embodiment, VM 60 assigns the value of 1 to high-end unused bits and uses 0 as the indicator of the stack pointer for tag stack register 40. Consequently, instructions that may be available in many modern processor architectures, such as rotational-shifting-left and arithmetic-shifting-right instructions, may be used to manage the tag stack in a very simply and efficient manner. For instance, in one or more embodiments, a single register instruction may be sufficient to push or pop an operand tag onto or off of the tag stack. Also, in one or more embodiments, the stack may be self-sustaining, in that, when tags are added to and removed from the tag stack, the stack pointer is automatically adjusted without any additional instructions being executed.

The present disclosure describes one or more embodiments of an approach to maintaining type information for operands on an operand stack. Such embodiments may provide increased storage efficiency, increased computational efficiency, or both, relative to conventional techniques. Various embodiments may be used to advantage by routines for GC, as well as and other types of routines.

In light of the principles and example embodiments described and illustrated herein, it will be recognized that the described embodiments can be modified in arrangement and detail without departing from such principles. For example, although the processing system in the example embodiment uses little-endian byte order, alternative embodiments include embodiments configured for use in systems using big-endian and other endian architectures.

Also, although the foregoing discussion has focused on particular embodiments, other configurations are contemplated as well. Even though expressions such as "in one embodiment," "in another embodiment," or the like may be used herein, these phrases are meant to generally reference embodiment possibilities, and are not intended to limit the invention to particular embodiment configurations. As used herein, these terms may reference the same or different embodiments that are combinable into other embodiments.

Similarly, although example processes have been described with regard to particular operations performed in a particular sequence, numerous modifications could be applied to those processes to derive numerous alternative embodiments of the present invention. For example, alternative embodiments may include processes that use fewer than all of the disclosed operations, processes that use additional operations, processes that use the same operations in a different sequence, and processes in which the individual operations disclosed herein are combined, subdivided, or otherwise altered.

Alternative embodiments of the invention also include machine-accessible media encoding instructions for performing the operations of the invention. Such embodiments may also be referred to as program products. Such machine-accessible media may include, without limitation, storage media such as floppy disks, hard disks, CD-ROMs, ROM, and RAM; as well as communications media such antennas, wires, optical fibers, microwaves, radio waves, and other electromagnetic or optical carriers. Accordingly, instructions and other data may be delivered over transmission environments or networks in the form of packets, serial data, parallel data, propagated signals, etc., and may be used in a distributed environment and stored locally and/or remotely for access by single or multi-processor machines.

It should also be understood that the hardware and software components depicted herein represent functional elements that are reasonably self-contained so that each can be designed, constructed, or updated substantially independently of the others. In alternative embodiments, many of the components may be implemented as hardware, software, or combinations of hardware and software for providing the functionality described and illustrated herein. The hardware, software, or combinations of hardware and software for performing the operations of the invention may also be referred to as logic or control logic.

In view of the wide variety of useful permutations that may be readily derived from the example embodiments described herein, this detailed description is intended to be illustrative only, and should not be taken as limiting the scope of the invention. What is claimed as the invention, therefore, is all implementations that come within the scope and spirit of the following claims and all equivalents to such implementations.

What is claimed is:

1. A method for managing type information for operands, the method comprising:
  accomplishing the following results through execution of a single register instruction in a tag stack register of a processor, the tag stack register to store a stack of operand tags for operands stored in an operand stack of a memory:
  adding an operand tag to the operand tag stack of the tag stack register; and
  updating a stack pointer for the operand tag stack by movement of the stack pointer within the tag stack register to recognize the addition of the operand tag to the operand tag stack, the stack pointer stored in the tag stack register and implicitly encoded, wherein a bit position of the stack pointer is to indicate a depth of the operand tag stack, the bit position corresponding to a number of operand tags stored in the tag stack register, and wherein a first significant bit of the tag stack register having a predetermined value serves as the stack pointer.

2. A method according to claim 1, wherein the single register instruction comprises a shift instruction.

3. A method according to claim 2, wherein the shift instruction comprises a rotate instruction.

4. A method according to claim 1, further comprising:
  accomplishing the following results through execution of one register instruction:
  removing an operand tag from the tag stack register; and
  updating the stack pointer for the operand tag stack to recognize the removal of the operand tag from the tag stack register.

5. A method according to claim 4, wherein the one register instruction comprises a shift right instruction.

6. A method for managing type information for operands, the method comprising:
- shifting a bit value of 1 into a first significant bit of a tag stack register and shifting all bits of the tag stack register in a first direction, in conjunction with creation of a reference operand, the tag stack register to be used for storing a stack of operand tags, each operand tag to indicate whether a corresponding operand on an operand stack is to be treated as a reference operand or a non-reference operand;
- shifting a bit value of 0 into the first significant bit of the tag stack register and shifting all bits of the tag stack register in the first direction, in conjunction with creation of a non-reference operand; and
- assigning a low order bit of the tag stack register to a value of 0 to implicitly encode a stack pointer, wherein a bit position of the stack pointer is to indicate a depth of the stack of operand tags, the bit position corresponding to a number of operand tags stored in the tag stack register, and a most significant bit of the tag stack register having the bit value of 0 serves as the stack pointer.

7. A method according to claim 6, further comprising:
- using a shift left operation to shift a bit value into a low order bit of the tag stack register and shift a bit value of preceding order bits of the tag stack register into succeeding order bits of the tag stack register in response to an operand being added to the operand stack.

8. A method according to claim 6, further comprising:
- right shifting bit values in the tag stack register in conjunction with removal of an operand, the operand being one of the reference operand and the non-reference operand.

9. A method according to claim 8, further comprising:
- shifting the bit value of 1 into a high order bit of the tag stack register in conjunction with removal of the operand.

10. A method according to claim 6 further comprising:
- treating a highest order bit with the value of 0 in the tag stack register as the stack pointer; and
- determining the depth of the stack of operand tags, based at least in part on a location of the stack pointer.

11. A processing system with control logic for managing type information for operands, the processing system comprising:
- a processor;
- a machine-accessible storage medium responsive to the processor; and
- instructions in the machine-accessible storage medium, the instructions to implement at least part of a virtual machine when executed by the processing system, the virtual machine to accomplishing the following results through execution of a single register instruction:
  - adding an operand tag to a first order position of a tag stack stored in a tag stack register to indicate a type of operand added to an operand stack, wherein the operand tag is of a first value to indicate a reference type and of a second value to indicate a non-reference type;
  - shifting a previous value stored in the first order position and all other order positions of the tag stack in a first direction; and
  - updating a stack pointer for the tag stack by movement of the stack pointer to recognize the addition of the operand tag to the tag stack, the stack pointer stored in the tag stack register and implicitly encoded, wherein a bit order position of the stack pointer is to indicate a depth of the tag stack, the bit position corresponding to a number of operand tags stored in the tag stack register, and a most significant bit of the tag stack register having the second value serves as the stack pointer.

12. A processing system according to claim 11, wherein the single register instruction to be used by the virtual machine to add the operand tag to the tag stack and to update the stack pointer comprises a shift instruction.

13. A processing system according to claim 12, wherein the shift instruction comprises a rotate instruction.

14. A processing system according to claim 11, the virtual machine further to accomplish the following results through execution of one register instruction:
- removing an operand tag from the tag stack; and
- updating the stack pointer for the tag stack to recognize the removal of the operand tag from the tag stack.

15. A processing system according to claim 11 wherein the processor supports a little-endian byte order.

16. An apparatus containing control logic for managing type information for operands, the apparatus comprising:
- a machine-accessible storage medium; and
- instructions in the machine-accessible storage medium, the instructions to implement at least part of a virtual machine when executed by a processing system, the virtual machine to accomplishing the following results through execution of a single register instruction:
  - adding an operand tag to a first order position of a tag stack stored in a tag stack register to indicate a type of operand added to an operand stack, wherein the operand tag is of a first value to indicate a reference type and of a second value to indicate a non-reference type;
  - shifting a previous value stored in the first order position and all other order positions of the tag stack in a first direction; and
  - updating a stack pointer for the tag stack by movement of the stack pointer to recognize the addition of the operand tag to the tag stack, the stack pointer stored in the tag stack register and implicitly encoded, wherein a bit order position of the stack pointer is to indicate a depth of the tag stack, the bit position corresponding to a number of operand tags stored in the tag stack register, and a most significant bit of the tag stack register having the second value serves as the stack pointer.

17. An apparatus according to claim 16, wherein the single register instruction to be used by the virtual machine to add the operand tag to the tag stack and to update the stack pointer comprises a shift instruction.

18. An apparatus according to claim 17, wherein the shift instruction comprises a rotate instruction.

19. An apparatus according to claim 16, the virtual machine further to accomplish the following results through execution of one register instruction:
- removing an operand tag from the tag stack; and
- updating the stack pointer for the tag stack to recognize the removal of the operand tag from the tag stack.

* * * * *